(12) United States Patent
Yamada et al.

(10) Patent No.: US 8,430,777 B2
(45) Date of Patent: Apr. 30, 2013

(54) POWER TRANSMISSION MECHANISM FOR PARALLEL HYBRID VEHICLE

(75) Inventors: Yoshiaki Yamada, Ageo (JP); Kunihiko Hikiri, Ageo (JP); Shuichi Nakamura, Ageo (JP); Kouichi Itani, Ageo (JP)

(73) Assignee: UD Trucks Corporation, Saitama (JP)

( * ) Notice: Subject to any disclaimer, the term of this patent is extended or adjusted under 35 U.S.C. 154(b) by 0 days.

(21) Appl. No.: 13/318,612

(22) PCT Filed: Nov. 18, 2009

(86) PCT No.: PCT/JP2009/006187
§ 371 (c)(1),
(2), (4) Date: Nov. 3, 2011

(87) PCT Pub. No.: WO2010/128542
PCT Pub. Date: Nov. 11, 2010

(65) Prior Publication Data
US 2012/0115659 A1    May 10, 2012

(30) Foreign Application Priority Data
May 7, 2009    (JP) .................................. 2009-112749

(51) Int. Cl.
*F16H 3/72*    (2006.01)
(52) U.S. Cl.
USPC ............................................. 475/5; 475/284
(58) Field of Classification Search ............... 475/5, 284
See application file for complete search history.

(56) References Cited

U.S. PATENT DOCUMENTS 5,433,282 A * 7/1995 Moroto et al. ............. 180/65.21
5,801,499 A   9/1998 Tsuzuki et al.
(Continued)

FOREIGN PATENT DOCUMENTS

| JP | 9-24752 A | 1/1997 |
|---|---|---|
| JP | 2000-108694 | 4/2000 |
| JP | 2003-191761 A | 7/2003 |

OTHER PUBLICATIONS

"Monthly Automotive Engineering", published by Tetsudo-Nipponsha Co., Ltd., Oct. 2006, pp. 47-49.
"Isuzu Technical Report", published by Isuzu Motors ltd., No. 113, 2005, pp. 66-69.
International Preliminary Report on Patentability and Written Opinion; International Application No. PCT/JP2009/006187; International Filing Date: Nov. 18, 2009.

*Primary Examiner* — David D Le
*Assistant Examiner* — Derek D Knight
(74) *Attorney, Agent, or Firm* — Antonelli, Terry, Stout & Kraus, LLP.

(57) ABSTRACT

A proposition is to provide a power transmission mechanism for parallel hybrid vehicle that is capable of smoothly combining/separating input/output powers of a motor and an engine, and is applicable to a large hybrid vehicle by ensuring sufficient strength of a mechanism for combining and separating the input/output powers.
It is characterized by including a motor output shaft of the motor/generator rotatable separately from an engine drive shaft system extending from a main clutch to a transmission, a motor-brake mounted on one end side of the motor output shaft to release/fix the motor output shaft, and a planetary gear mechanism mounted between another end side of the motor output shaft and the engine drive shaft system and including a sun gear provided on the other end side of the motor output shaft, an outer gear provided on the engine drive shaft system and having a gear ratio to the sun gear of 1:1, a plurality of planetary gears with which the sun gear and the outer gear are engaged, and a planetary carrier picking up orbital motions of the planetary gears, and a gear brake mounted on one end side of the planetary carrier to release/fix the planetary carrier.

1 Claim, 4 Drawing Sheets

U.S. PATENT DOCUMENTS

| | | |
|---|---|---|
| 6,394,924 B1 | 5/2002 | Schiebold et al. |
| 8,075,436 B2 * | 12/2011 | Bachmann ........................ 475/5 |
| 2005/0037883 A1 | 2/2005 | Motoike et al. |
| 2010/0203995 A1 * | 8/2010 | Zhang et al. ...................... 475/5 |
| 2011/0237378 A1 * | 9/2011 | Rask et al. ........................ 475/5 |
| 2011/0275466 A1 * | 11/2011 | Rask et al. ........................ 475/5 |
| 2012/0115659 A1 * | 5/2012 | Yamada et al. ................... 475/5 |
| 2012/0129638 A1 * | 5/2012 | Kaltenbach et al. .............. 475/5 |
| 2012/0149514 A1 * | 6/2012 | Tiwari et al. ...................... 475/5 |
| 2012/0197472 A1 * | 8/2012 | He et al. .......................... 701/22 |
| 2012/0244979 A1 * | 9/2012 | Kruger .............................. 475/5 |
| 2012/0258830 A1 * | 10/2012 | Yoon et al. ........................ 475/5 |

* cited by examiner

POWER TRANSMISSION MECHANISM FOR PARALLEL HYBRID VEHICLE

CROSS-REFERENCE TO RELATED APPLICATION

This application is a U.S. National Stage application under 35 U.S.C. §371 claiming benefit of prior filed International Application Number PCT/JP2009/006187, filed Nov. 18, 2009, in which the International Application claims a priority date of May 7, 2009 based on prior filed Japanese Patent Application Number 2009-112749, the entire contents of which are incorporated herein by reference.

TECHNICAL FIELD

The present application relates to a power transmission mechanism for hybrid vehicle, more particularly, to a power transmission mechanism for parallel hybrid vehicle using powers of an engine and a motor/generator in combination.

BACKGROUND ART

As disclosed in Non-patent Document 1, with the aim of improving mileage by reducing a load applied to an engine in a commercial vehicle such as a truck, there has recently been proposed a parallel hybrid system using an assisting power of a motor during driving where a load is applied to the engine such as during start-up or during uphill driving.

As illustrated in FIG. 6, the arrangement of a driving system of the above hybrid system is such that an engine 1, a main clutch (single plate clutch) 3, a motor (motor/generator) 5, a transmission 7, and a final reduction gear 9 are all arranged coaxially in the order mentioned. A rotor 13 of the motor 5 is attached to an engine drive shaft system 11 extending from the main clutch 3 to the transmission 7, and a propeller shaft 15 is coupled between the transmission 7 and the final reduction gear 9.

With this structure, the aforesaid hybrid system starts only with a driving force of the motor 5 with the clutch 3 being disconnected, and when the vehicle reaches a prescribed speed (in the vicinity of about 5 to 6 km/h), it synchronizes the rotations of the engine 1 and the motor 5, connects the clutch 3, and starts driving only with the engine 1.

Then, during the driving where a load is applied, such as during uphill driving, the system enters high-power driving where the engine 1 and the motor 5 are used in combination according to a depression amount of an accel pedal, and during deceleration/braking, according to the situation, the clutch 3 is disconnected and the motor 5 is reversely operated, whereby a regenerative brake corresponding to an engine brake is applied, and a regenerative energy is stored in batteries.

However, a power transmission mechanism of the aforesaid hybrid system has a drawback that during the driving only with the driving force of the engine 1, a mechanical loss occurs due to an influence of a magnet put on the rotor 13. Further, supplying electricity to a stator 17 of the motor 5 in order to cancel such a load loss newly causes the occurrence of an electric loss.

As a power transmission mechanism of a hybrid system realizing a reduction of such a loss, Non-patent Document 2 discloses an art in which a motor output shaft 19 is structured separately from an engine drive shaft system 11 and a clutch mechanism 21 formed by a dog clutch is mounted between the motor output shaft 19 and the engine drive shaft system 11, as illustrated in FIG. 7.

PRIOR ART DOCUMENT

Non-Patent Document

Non-patent Document 1: "Monthly Automotive Engineering" published by Tetsudo-Nipponsha Co., Ltd., October, 2006, pages 47-49
Non-patent Document 2: "Isuzu Technical Report" published by Isuzu Motors Ltd., No. 113, 2005, pages 66-69

DISCLOSURE

Problems to be Solved

However, smooth connection/disconnection of the dog clutch forming the aforesaid clutch mechanism 21 requires highly precise and complicated synchronization control of the rotation speeds.

Further, the power transmission mechanism of the hybrid system in FIG. 7 is structured on assumption that it is mounted on a small two to three ton truck, and if it is to be applied to a heavy-duty truck requiring a high motor power, there is a concern about insufficient strength and insufficient durability of the dog clutch.

The present application was devised in consideration of the above circumstances and a proposition thereof is to provide a power transmission mechanism for parallel hybrid vehicle that is capable of smoothly combining and separating input/output powers of a motor and an engine, and that is applicable to a large hybrid vehicle having a load capacity over 10 tons by ensuring sufficient strength of a mechanism for combining and separating the input/output powers.

Means for Solving the Problems

To attain such a proposition, according to a first aspect of the embodiment is a power transmission mechanism for parallel hybrid vehicle in which an engine, a main clutch, a motor/generator, a transmission, and a final reduction gear are arranged coaxially and powers of the engine and the motor/generator are used in combination, the power transmission mechanism including a motor output shaft of the motor/generator rotatable separately from an engine drive shaft system extending from the main clutch to the transmission, a motor-brake mounted on one end side of the motor output shaft to release/fix the motor output shaft, a planetary gear mechanism mounted between another end side of the motor output shaft and the engine drive shaft system and including a sun gear provided on the other end side of the motor output shaft, an outer gear provided on the engine drive shaft system and having a gear ratio to the sun gear of 1:1, a plurality of planetary gears with which the sun gear and the outer gear are engaged, and a planetary carrier picking up orbital motions of the planetary gears, and a gear brake mounted on one end side of the planetary carrier to release/fix the planetary carrier, in which, when the main clutch and the gear brake are fixed and the motor-brake is released, a driving force of the motor/generator is transmitted from the planetary gear mechanism to the engine drive shaft system to be combined with a driving force of the engine, when the main clutch and the motor-brake are released and the gear brake is fixed, only the driving force of the motor/generator is transmitted from the engine drive shaft system to the transmission, and the motor/generator reversely operates to apply a regenerative brake during braking of the vehicle, and when the main clutch and the motor-brake are fixed and the gear brake is released, only the driving force of the engine is transmitted from the engine drive shaft system to the transmission.

Effect of the Invention

According to a first aspect of the embodiment when the motor/generator is in non-operation, the motor output shaft is fixed and thus does not rotate, which has an advantage that a mechanical loss and an electric loss can be more reduced than conventionally and a load of the engine is reduced, resulting in improved mileage.

Further, since the planetary gear mechanism of constant mesh type is adopted for the power transmission between the motor output shaft and the engine drive shaft system, it is possible to smoothly connect and disconnect the both shafts with/from each other, and in addition, the planetary gear mechanism can have sufficient strength, which enables the application to a heavy-duty truck requiring a high motor power.

DETAILED DESCRIPTION OF THE EMBODIMENTS

Hereinafter, embodiments of the present invention will be described in detail based on the drawings.

Figure 6:
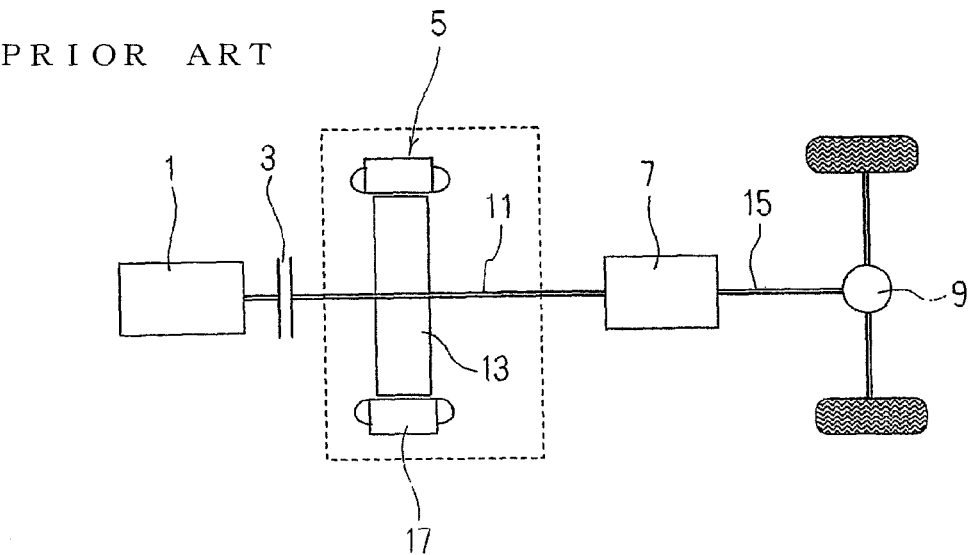
FIG. 6 is a schematic block diagram of a conventional power transmission mechanism.

FIG. 1 to FIG. 4 illustrate a first embodiment of a power transmission mechanism of a parallel hybrid vehicle according to claim 1, and as in the conventional example in FIG. 6, the arrangement of a driving system of a hybrid system according to this embodiment is such that an engine 21, a main clutch (single plate clutch) 23, a motor (motor/generator) 25, a transmission 27, and a final reduction gear 29 are all arranged coaxially in the order mentioned. An engine drive shaft system 31 extends from the main clutch 23 to the transmission 27, and a propeller shaft 33 is coupled between the transmission 27 and the final reduction gear 29.

Further, in the drawings, 35 denotes a motor output shaft attached to a rotor 37 of the motor 25, and the motor output shaft 35 is structured separately from the engine drive shaft system 31 and is rotatably supported by a not-illustrated motor body via a bearing. A motor-brake 39 releasing/fixing the motor output shaft 35 is mounted on one end, of the motor output shaft 35, closer to the main clutch 23.

The motor-brake 39 has a structure similar to a disk brake, for instance, and when a brake disk 41 provided on the motor output shaft 35 is sandwiched by not-illustrated brake pads or the like (the motor-brake 39 is fixed), the rotation of the motor output shaft 35 is braked, so that the motor output shaft 35 is fixed, and when the brake pads or the like separate from the brake disk 41 (the motor-brake 39 is released), the braking to the motor output shaft 35 is cancelled.

Between the other end side of the motor output shaft 35 and the engine drive shaft system 31, a planetary gear mechanism 43 is provided.

Figure 1:
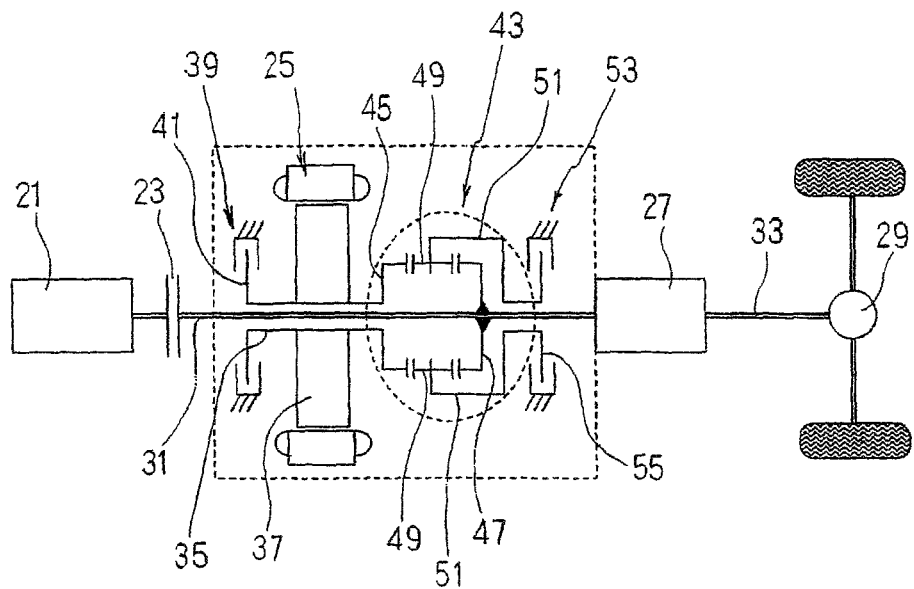
FIG. 1 is a schematic block diagram of a power transmission mechanism according to a first embodiment of claim 1.

As illustrated in FIG. 1, the planetary gear mechanism 43 includes: a sun gear 45 provided on the other end side of the motor output shaft 35; an outer gear 47 attached to the engine drive shaft system 31 to face the sun gear 45; a plurality of planetary gears 49 with which the sun gear 45 and the outer gear 47 are engaged; and a planetary carrier 51 picking up orbital motions of the planetary gears 49, and the sun gear 45 and the outer gear 47 are formed as if they are a pair of right and left differential side gears of a conventionally-known differential gear, and their gear ratio is set to 1:1, meaning that their radii of rotation are equal. Therefore, as illustrated in the drawing, rotation shafts of the planetary gears 49 attached to the planetary carrier 51 are set at a right angle to the motor output shaft 35.

On the other end side of the planetary carrier 51, a gear brake 53 is provided to release/fix the planetary carrier 51 to release/fix the orbital rotation of the planetary gears 49.

Similarly to the motor-brake 39, the gear brake 35 also has a structure similar to a disk brake, for instance, and when a brake disk 55 provided on the other end side of the planetary gears 49 is sandwiched by not-illustrated brake pads or the like (the gear brake 53 is fixed), the rotation of the planetary carrier 51 is braked, so that the orbital rotation of the planetary gears 49 is fixed, and when the brake pads or the like separate from the brake disk 55 (the gear brake 53 is released), the braking to the planetary carrier 51 is cancelled, so that the planetary gears 49 are again capable of orbital rotation.

The power transmission mechanism 57 according to this embodiment is structured as described above, and the operation thereof will be described next.

Figure 2:
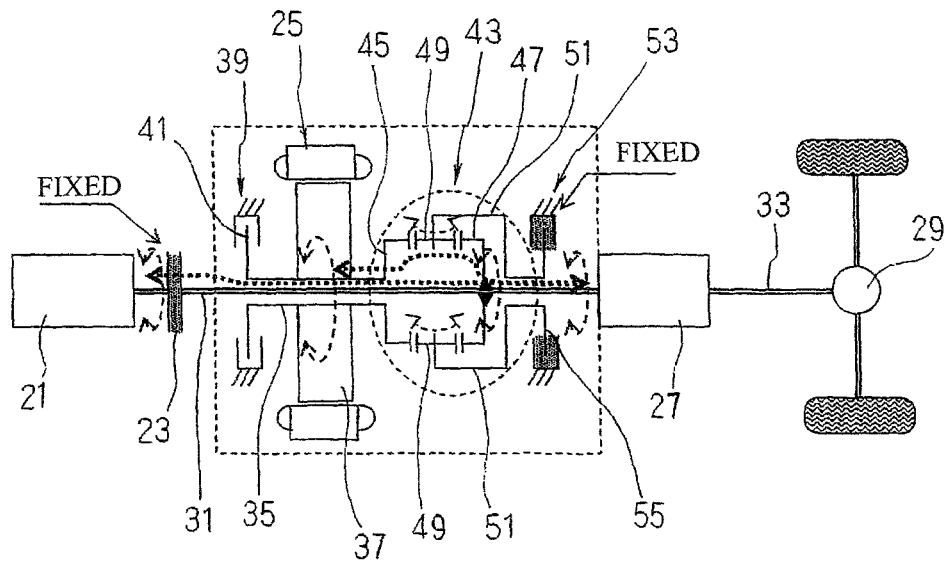
FIG. 2 is a schematic block diagram of the power transmission mechanism when an engine and a motor are used in combination.

First, as illustrated in FIG. 2, for instance, when the main clutch 23 is connected to be "fixed", the gear brake 53 (the planetary gears 49) is "fixed" by having the brake pads or the like sandwich the brake disk 55, and the motor-brake 39 (the motor output shaft 35) is "released" by having the brake pads or the like separate from the brake disk 41, the orbital rotation of the planetary gears 49 is restricted and they are only capable of rotating on their axes.

As a result, the motor 25 and the engine drive shaft system 31 are connected, the driving force of the motor 25 is transmitted from the sun gear 45 via the planetary gears 49 and the outer gear 47 to the engine drive shaft system 31, resulting in what is called "motor full, engine assist" where the driving force of the motor 25 is used in combination with the driving force of the engine 21.

Figure 3:
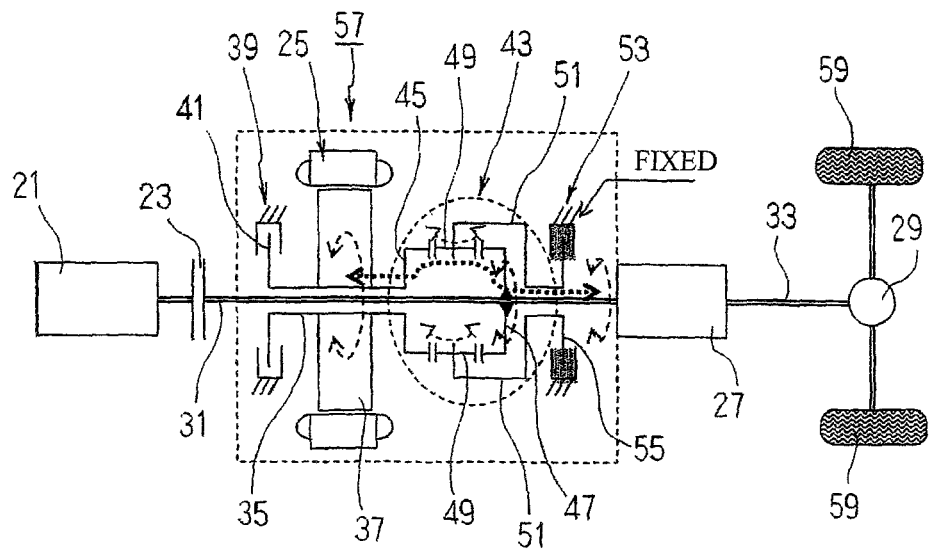
FIG. 3 is a schematic block diagram of the power transmission mechanism when only a driving force of the motor is used for driving.

Further, for example, where the vehicle is started only with the driving force of the motor 25 without using the engine 21, the gear brake 53 (the planetary carrier 51) is "fixed", the main clutch 23 is disconnected, and the motor-brake 39 (the motor output shaft 35) is "released" by having the brake pads or the like separate from the brake disk 41 as illustrated in FIG. 3, so that the orbital rotation of the planetary gears 49 is restricted, and consequently only the driving force of the motor 25 is transmitted from the engine drive shaft system 31 to the transmission via the sun gear 45, the planetary gears 49, and the outer gear 47 and the vehicle starts only with the driving force of the motor 25. Then, connecting the main clutch 23 at an instant when the vehicle reaches a prescribed speed as illustrated in FIG. 2 results in the aforesaid "motor full, engine assist", and at the time of the braking of the vehicle, when the main clutch 23 is disconnected from the state in FIG. 2 as illustrated in FIG. 3, a torque from tires 59 is input to the motor 25 via the planetary gear mechanism 43 to cause the reverse operation of the motor 25, so that a regenerative brake corresponding to an engine brake is applied and a regenerative energy is stored in batteries.

Figure 4:
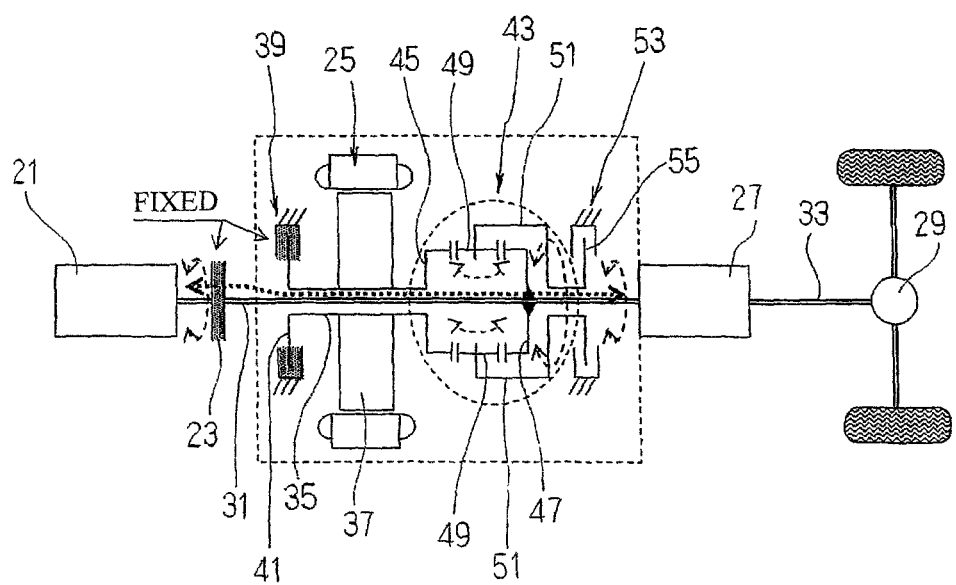
FIG. 4 is a schematic block diagram of the power transmission mechanism when only a driving force of the engine is used for driving.

On the other hand, when the main clutch 23 is connected to be "fixed", the motor-brake 39 (the motor output shaft 35) is "fixed" by having the brake pads or the like sandwich the brake disk 41, and the gear brake 53 (the planetary carrier 51) is "released" by having the brake pads or the like separate from the brake disk 55 as illustrated in FIG. 4, the motor 25 stops and the planetary gears 49 make the orbital rotation while rotating on their axes, so that the planetary gears 49 and the planetary carrier 51 rotate free and the vehicle drives only with the driving force of the engine 21.

Therefore, it is only necessary for a controller (not illustrated) to release/fix the motor-brake 39 and the gear brake 53 as in FIG. 2 to FIG. 4 according to the situation such as whether the vehicle is in a driving state where a load is applied to the engine 21, such as the uphill driving, and based on the detection of a battery volume and a depression amount of the accel pedal when, for example, the vehicle starts driving,

[1] when the accel pedal is strongly pressed down because of hill start and there is a sufficient battery volume, the controller "fixes" the gear brake 53 and "releases" the motor-brake 39 as in FIG. 2, which results in high-power driving where the driving forces of the engine 21 and the motor 25 are used in combination.

Further, for example,

[2] when the battery volume is not large enough to drive the motor 25 even though the accel pedal is strongly pressed down because of the hill start, the controller "releases" the gear brake 53 and "fixes" the motor-brake 39 as illustrated in FIG. 4, so that the vehicle drives only with the driving force of the engine 21.

Further,

[3] when the accel pedal is pressed down slightly because of the start on a flat road and the battery volume is sufficient, the controller "fixes" the gear brake 53 and "releases" the motor-brake 39 as illustrated in FIG. 3, so that the vehicle starts only with the driving force of the motor 25 as previously described. Then, when the vehicle reaches a prescribed speed, the driver's connection of the main clutch 23 as illustrated in FIG. 2 results in "motor full, engine assist" in FIG. 2, and at the time of the braking of the vehicle, when the controller determines that the battery volume is insufficient to disconnect the main clutch 23 from the state in FIG. 2 as illustrated in FIG. 3, the regenerative brake corresponding to the engine brake is applied to the motor 25 and the regenerative energy is stored in the batteries.

Further, when the detection of the depression amount of the brake pedal indicates that the brake pedal is pressed down strongly, the controller operates the main clutch 23, the motor-brake 39, and the gear brake 53 to the state in FIG. 3, so that the regenerative brake corresponding to the foot brake and the engine brake is applied to suddenly brake the vehicle.

As described above, this embodiment can reduce a mechanical loss and an electric loss more than the conventional example illustrated in FIG. 6 because of the structure where the motor output shaft 35 is fixed when the motor 25 is in non-operation as illustrated in FIG. 4, which has an advantage that a load of the engine 21 is reduced and mileage is improved.

Figure 7:
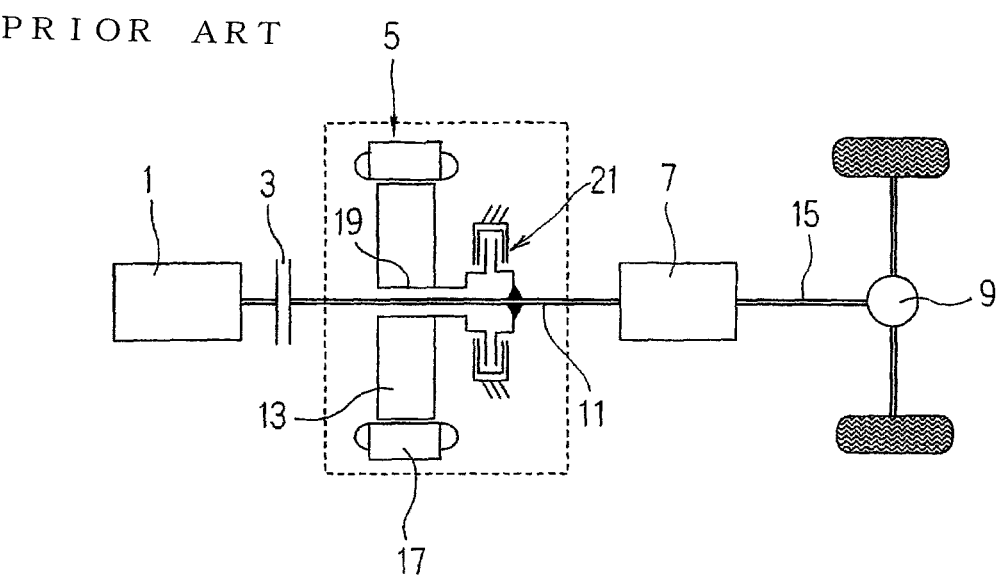
FIG. 7 is a schematic block diagram of another conventional power transmission mechanism.

Further, in this embodiment, since, for the power transmission between the motor output shaft 35 and the engine drive shaft system 31, the planetary gear mechanism 43 of constant mesh type is adopted instead of the clutch mechanism 21 formed by the dog clutch in FIG. 7, it is possible to smoothly connect and disconnect the both shafts 35, 31 with/from each other, and the planetary gear mechanism 43 can have sufficient strength, which enables the application to a heavy-duty truck requiring a high motor power.

Figure 5:
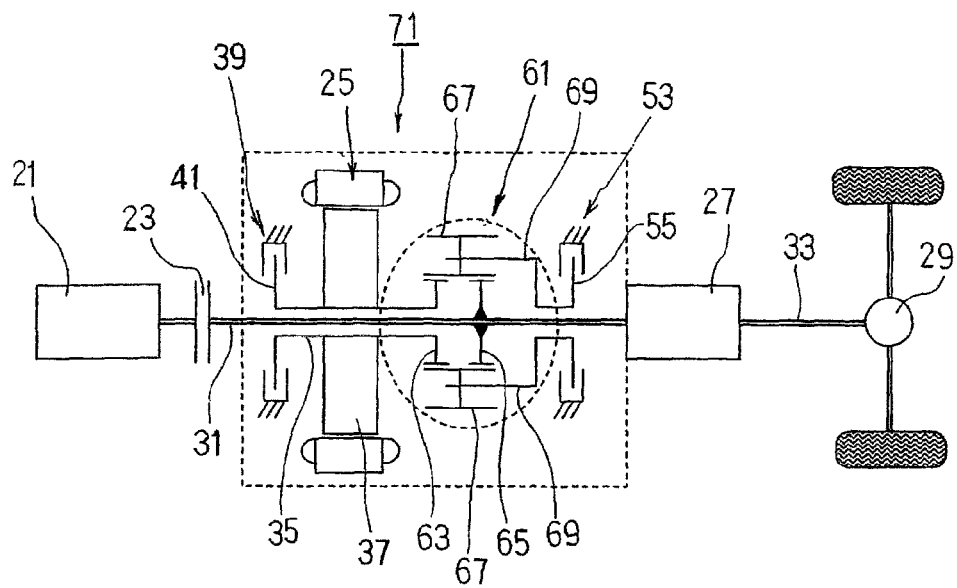
FIG. 5 is a schematic block diagram of a power transmission mechanism according to a second embodiment of claim 1.

As described above, in the above embodiment, the sun gear 45 and the outer gear 47 of the planetary gear mechanism 43 are formed as if they are a pair of right and left differential side gears of a differential gear, with their gear ratio being 1:1, meaning that their radii of rotation are equal, and the rotation shafts of the planetary gears 49 attached to the planetary carrier 51 are set at a right angle to the motor output shaft 35, but another alternative structure may be such that, as illustrated in FIG. 5, a sun gear 63 and an outer gear 65 of a planetary gear mechanism 61 are formed as a spur gear system whose gear ratio is 1:1, planetary gears 67 engaged with both of the gears 63, 65 are formed as a spur gear system, and rotation shafts of the planetary gears 67 attached to a planetary carrier 69 are set parallel to the motor output shaft 35. The other structure is the same as that of the embodiment in FIG. 1, and therefore, the same components are denoted by the same reference numerals and description thereof will be omitted.

A power transmission mechanism 71 according to this embodiment is thus structured, and similarly to the aforesaid embodiment, this embodiment can also attain the desired propositions, that is, it is possible to smoothly connect and disconnect the motor output shaft 35 and the engine drive shaft system 31 with/from each other, and the planetary gear mechanism 61 can have sufficient strength, which enables the application to a heavy-duty truck requiring a high motor power.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A power transmission mechanism for parallel hybrid vehicle in which an engine, a main clutch, a motor/generator, a transmission, and a final reduction gear are arranged coaxially and powers of the engine and the motor/generator are used in combination, the power transmission mechanism comprising:
   a motor output shaft of the motor/generator rotatable separately from an engine drive shaft system extending from the main clutch to the transmission;
   a motor-brake mounted on one end side of the motor output shaft to release/fix the motor output shaft;
   a planetary gear mechanism provided between another end side of the motor output shaft and the engine drive shaft system and including a sun gear provided on the other end side of the motor output shaft, an outer gear provided on the engine drive shaft system and having a gear ratio to the sun gear of 1:1, a plurality of planetary gears with which the sun gear and the outer gear are engaged, and a planetary carrier picking up orbital motions of the planetary gears; and
   a gear brake mounted on one end side of the planetary carrier to release/fix the planetary carrier, wherein:
   when the main clutch and the gear brake are fixed and the motor-brake is released, a driving force of the motor/generator is transmitted from the planetary gear mechanism to the engine drive shaft system to be combined with a driving force of the engine;
   when the main clutch and the motor-brake are released and the gear brake is fixed, only the driving force of the motor/generator is transmitted from the engine drive shaft system to the transmission, and the motor/generator reversely operates to apply a regenerative brake during braking of the vehicle; and
   when the main clutch and the motor-brake are fixed and the gear brake is released, only the driving force of the engine is transmitted from the engine drive shaft system to the transmission.

\* \* \* \* \*